United States Patent [19]

Progl

[11] Patent Number: 4,968,230

[45] Date of Patent: Nov. 6, 1990

[54] LUBRICATING-OIL PUMP CONTROL

[75] Inventor: Rudolph Progl, Rock Hill, S.C.

[73] Assignee: Textron Inc., Providence, R.I.

[21] Appl. No.: 200,506

[22] Filed: May 31, 1988

[51] Int. Cl.$^5$ .............................. F04B 49/00
[52] U.S. Cl. ............................ 417/500; 184/33
[58] Field of Search ............ 417/492, 500; 92/13, 92/13.4, 13.41, 116; 184/33; 123/45 R

[56] References Cited

U.S. PATENT DOCUMENTS

| 2,070,203 | 2/1937 | Gregg | 184/33 |
| 2,347,364 | 4/1944 | Palumbo | 123/45 R |
| 2,688,989 | 9/1954 | Smith | 184/27.1 |
| 3,486,455 | 12/1969 | Jemison | 92/13 |
| 3,914,073 | 10/1975 | Fusco | 417/500 |
| 4,636,147 | 1/1987 | Schweitzer et al. | 184/33 |
| 4,644,658 | 2/1987 | Dolata et al. | 30/381 |
| 4,678,411 | 7/1987 | Weiland | 417/500 |
| 4,797,073 | 1/1989 | Kubato | 417/461 |

Primary Examiner—Leonard E. Smith
Assistant Examiner—Robert N. Blackmon
Attorney, Agent, or Firm—Abraham Ogman

[57] ABSTRACT

The invention is directed to a motor-driven apparatus such as a motor-driven chain saw and the like having a lubricating-oil pump and an oil supply for a work tool and to apparatus for varying the reciprocatory stroke distance of the oil piston or pumping member to thereby provide selective regulation of oil flow from full flow to through no flow in response to the stroke distance of the pumping member.

3 Claims, 4 Drawing Sheets

LUBRICATING-OIL PUMP CONTROL

FIELD OF THE INVENTION

The present invention relates to a lubricating-oil pump for motor-driven apparatus such as chain saws and the like wherein the pump delivers oil to the work tool of the apparatus. More particularly the invention relates to a reciprocating oil pump control apparatus for selective regulation of the oil flow from full flow through no flow in response to the stroke distance of the pumping piston.

BACKGROUND OF THE INVENTION

Conventional motor-driven apparatus such as motor-driven chain saws have as standard equipment a lubricating-oil pump feeding lubricating oil from an oil tank to the moving saw chain.

Known motor-driven apparatus such as motor-driven chain saws where the saw chain moves around a guide bar are equipped with a lubricating-oil pump which in the operation of the chain saw continuously feeds lubricating oil for the chain links into a groove in the guide bar. Motor-driven apparatus of this type are also equipped with other attachments or tools, for example, with hedge trimmers, drills or the like which require no lubrication during operation. Further, it is known to equip motor-driven chain saws with sharpening devices which permit resharpening the cutting links with the motor running and the saw chain rotating.

When working with the known attachment tools which require no oil lubrication, it has been customary to drain the oil tank prior to mounting the attachment in order to avoid an unintentional oil leakage. For this purpose, the lubricating oil was collected in a suitable container to be saved for later use. In various applications the operator did not drain the oil tank so that oil continued to be fed without being needed; this resulted in additional oil consumption and environmental pollution. Also in other operations such as when the tool is being operated in the idle state, continuous lubrication of the tool is unnecessary.

In U.S. Pat. No. 2,070,203 there is disclosed a reciprocating oil pump in which the amount of oil pumped can be varied between a maximum delivery and a minimum delivery. As disclosed the piston in the pumping cylinder is provided with a pair of spaced cams rotatable with the piston. A sleeve providing a bearing for a portion of the piston is provided and has a cam pin secured to it for reciprocating the piston. The sleeve bearing is rotatably adjustable so as to change the relative circumferential position of the cam pin and cam surfaces to thereby change the quantity of oil pumped from a maximum delivery to a minimum delivery.

In U.S. Pat. No. 2,688,989 there is disclosed a lubricating device for chain saws in which the reciprocating pump is operable by an external plunger slidably mounted on the saw frame in a back position as to be engaged by the surface of log work piece which causes the piston to move inwardly against a spring means and thereby force oil under pressure through a conduit to the saw cutter links.

U.S. Pat. No. 4,636,147 discloses a lubricating-oil pump for a motor-driven apparatus which provides for interruption of the supply of lubricating oil to the tool driven by the motor. As disclosed, a control member is flattened on two opposite sides so that when turned in the inoperative position it does not contact the two control discs which effect axial stroke movement of the reciprocating piston with the result that the movement of the piston comes to a stop and oil flow is interrupted.

U.S. Pat. No. 4,644,658 discloses a lubricating-oil pump for a motor-driven apparatus having a work tool driven by the motor and interrupt means for interrupting the flow of lubricating oil to the work tool. The interruption of the oil supply is accomplished by blocking the upward stroke movement of the piston rod and pump diaphragm.

While such prior art devices provide improvement in the areas intended that is providing only an on/off regulation of the supply of oil, there still exists a great need to provide a lubricating-oil pump for motor-driven apparatus having a simple effective means for full range of the quantity of oil flow including reducing, increasing or stopping the quantity of oil flow as needed.

Accordingly, a principal desirable object of the invention is to provide a lubricating-oil pump system for motor-driven apparatus and the like with a state of control apparatus for regulating the quantity of oil flow from full maximum flow through a full intermediate range to a no flow or interrupted flow state.

Another desirable object of the present invention is to provide a lubricating-oil pump system which is positive and efficient in operation and which is readily and easily adjustable to regulate the quantity of oil flow.

Another desirable object of the present invention is to provide a lubricating-oil pump system of the above described objects which is compact, efficient, and of relatively inexpensive construction.

These and other desirable objects of the invention will in part appear hereinafter and will in part become apparent after consideration of the specification with reference to the accompanying drawings and the claims.

SUMMARY OF THE INVENTION

The invention provides a lubricating oil pump control system for motor driven apparatus such as a chain saw oil pump comprising an engine supported by a suitable frame, together with means on the frame defining a pumping chamber including an inlet and an outlet, and a pumping member having means imparting rotary and reciprocatory movement to the pumping member in the pumping chamber relative to the inlet and outlet so as to effect an oil pumping operation incident to such movement, together with means for selectively regulating the quantity of oil flow to the work tool.

In one embodiment of the invention an oil pump for supplying lubricating oil to the work tool of a motor driven apparatus includes a frame supporting the work tool, wall means on the frame defining a pumping chamber including an oil inlet port and an oil outlet port, a pumping member rotatably mounted in the pumping chamber relative to the inlet and outlet ports so as to effect reciprocatory movement of the pumping member through a predetermined stroke distance in response to the rotary movement for pumping the lubricating oil to provide a flow of oil, means to effect rotary movement of the pumping member through the predetermined stroke distance for pumping the lubricating oil. Control means are provided selectively varying the quantity of oil flow in the intermediate range between full maximum flow and no flow including means for selectively adjusting the stroke distance of the pumping member relative to the inlet and outlet ports and the predetermined stroke distance and means for positively positioning the pump member for the stroke distance selected.

In another embodiment of the invention, the means for regulating the flow of lubricating oil includes a cam member fixed on the pumping member and rotatable therewith and having a tapered annular groove inclined to a plane perpendicular to the axis of rotation of the pumping member, a tapered pin member extending from the frame and engaging the tapered annular groove for providing axial reciprocatory movement of the pumping member through a predetermined stroke distance in response to rotation of the cam member, and means for selectively varying the flow of oil including means for moving the tapered pin member within the tapered cam groove in a plane perpendicular to the axis of rotate on of the pumping member between a position of full contact with the tapered groove whereat a maximum quantity of oil is pumped relative to the rotary and axial movement of the pumping member through intermediate positions where the quantity of oil flow is respectively reduced to a position of no-contact with the cam groove whereat the pumping of oil relative to the rotary and axial movement of the pumping member is stopped.

In still another embodiment of the invention, the means for regulating the flow of lubricating oil includes a cam member fixed on the pumping member and rotatable therewith and having an angular groove formed in the cam member and inclined to a plane perpendicular to the axis of rotation of the pumping member, a pin member extending from the frame and engaging the annular groove for reciprocatory movement of the pumping member through a predetermined stroke distance in response to rotation of the cam member, the pin member having a variable cross-sectional area in a plane parallel to the axis of rotation of the pumping member, and means for rotating the pin member within the cam groove and about an axis perpendicular to the axis of rotation of the pumping member whereby the variable cross-sectional area of the pin member varies the stroke distance of the pumping member both forward and back and the flow of lubricating oil from full maximum flow to no flow.

BRIEF DESCRIPTION OF THE DRAWINGS

For a fuller understanding of the nature and desired objects of the invention, reference should be had to the following detailed description taken in connection with the accompanying drawings wherein like reference characters denote corresponding parts throughout the several views and wherein.

DETAILED DESCRIPTION OF PREFERRED EMBODIMENTS

Figure 1:
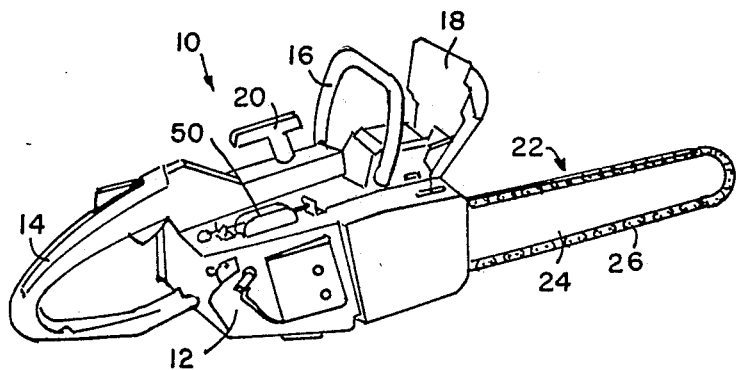
FIG. 1 is a perspective view of a chain saw incorporating various features of the invention.

The motor driven apparatus illustrated in FIG. 1 of the drawing is in the form of a motor-driven chain saw designated generally by the numeral 10 and includes a drive motor (not shown) mounted in housing frame 12 which is provided with a rearward guide handle 14, a forward carrying handle 16, and a guard 18. On top of housing 12 is a pull starter 20 for starting the drive motor. In addition the motor-driven chain saw 10 includes a forwardly extending guide bar assembly 22 having a guide bar 24 on which a saw chain 26 is guided in its movement therearound. The engine drivingly rotates a conventional drive sprocket (not shown) around which is trained chain 26 which travels in a peripheral groove (not shown) about the guide bar 24.

Also included in the chain saw 10 and supported by the housing frame 12 is an oil or lubricating pump designated generally by the numeral 28 which includes a wall means 30 defining a pumping chamber 32 having spaced inlet and outlet ports 34 and 36 which respectively communicate through a conduit (not shown) with a lubricant source (not shown) and through a discharge conduit (not shown) which delivers oil to the saw chain 26 all as is well known. Also included in the lubricant pump 28 is a pumping piston or member 38 which is mounted for rotary and reciprocal movement relative to the pumping chamber 32 so as to effect pumping of lubricating oil from the inlet port 34 into the chamber 32 and the pumping of the lubricating oil from the chamber 32 through the outlet port 36 and into a discharge conduit for delivery to the area to be lubricated.

Figure 2:
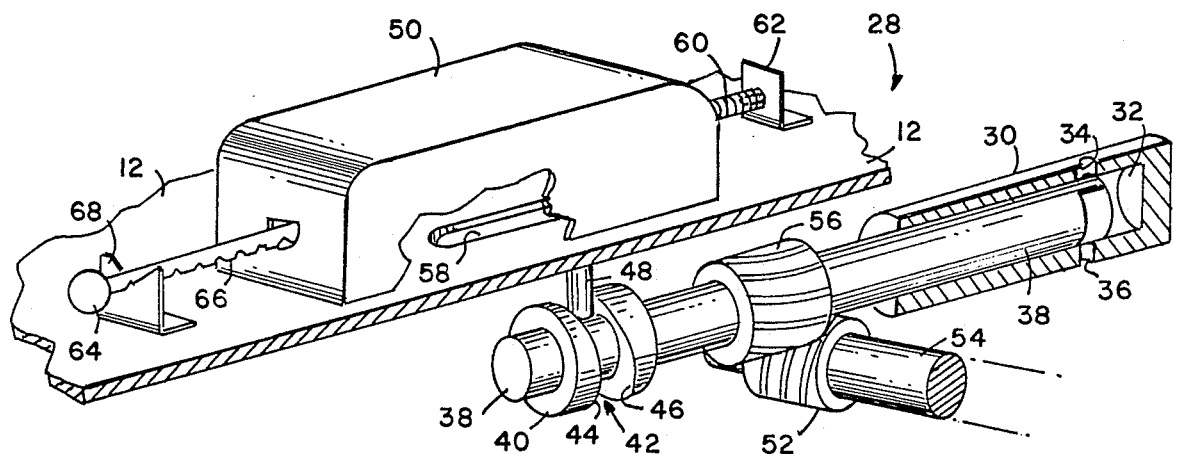
FIG. 2 is an enlarged, fragmentary perspective view, with parts broken away and in section, of a lubricating pump in accordance with the invention and incorporated in the chain saw of FIG. 1 and shown in operative connection.
Figure 3:
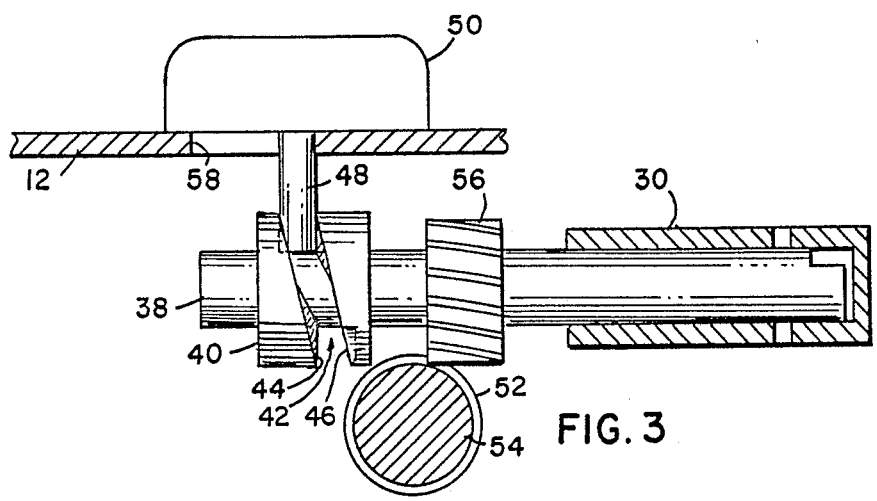
FIG. 3 is a side elevation view partly in section of the lubricating pump of FIG. 2 with the pumping member in position for pumping lubricating oil.
Figure 4:
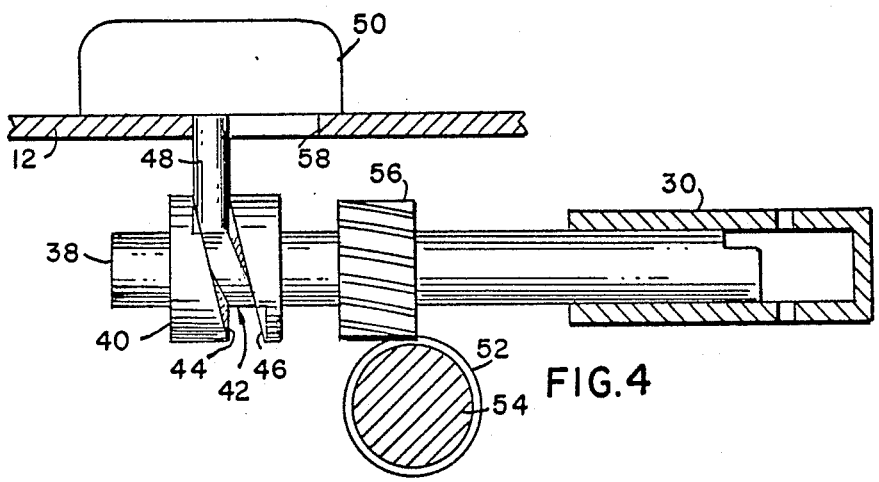
FIG. 4 is a view similar to FIG. 3 but showing the pumping member in position for interrupting the flow of lubricating oil.
Figure 5:
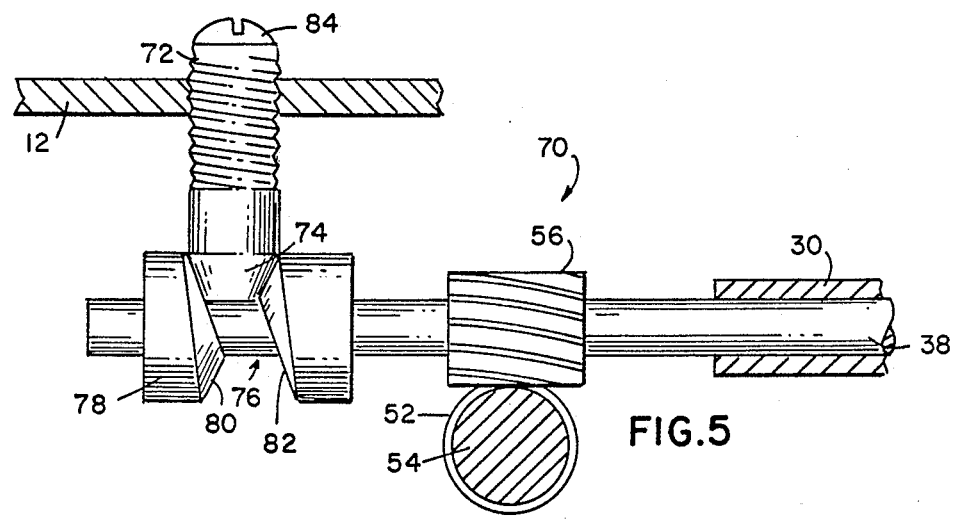
FIG. 5 is a fragmentary side elevation view of a lubricating pump illustrating another embodiment of the present invention.

The oil pump 28 also includes means for reciprocating or axially displacing the pumping member 38 in response rotation of the pumping member to provide positive actuation and comprises a cam member 40 carried or fixed on pumping member 38, an annular groove 42 formed in cam member 40 and which is inclined to a plane perpendicular to the axis of pumping member 38 and has groove surfaces 44 and 46. The cam groove 42 receives pin member 48 which is attached to a positive positioning means such as, for example, control member 50 and moveable therewith. The control member 50 is supported on a portion of housing frame 12. Rotation of pumping member 38 is accomplished by a first gear 52 fixed on shaft 54 rotated by the drive motor or engine together with a second gear 56 in mesh with the first gear 52 and carried by the pumping member 38 for rotary and axial movement relative thereto. Thus in the arrangement shown in FIGS. 2 and 3, rotation of shaft 54 series to rotate pumping member 38 whereby pin member 48 engages the surfaces 44 and 46 of cam member annular groove 42. The rotary movement of cam member 40 serves to effect positive reciprocation of the pumping member 38 through a predetermined stroke distance in both directions to effect pumping of the lubricating oil. In the embodiment of FIGS. 2-4 the control member 50 is mounted on housing 12 so that pin member 48 extends through slot opening 58 to engage cam groove 42. The slot opening 58 is preferably axially aligned with pumping member 38 and permits axial movement of the control member 50 and associated pin member 46 in the direction of the axial movement of the pumping member 38 so as to effect axial movement of the pumping member in response to movement of the control member 50. In this manner the control member 50 coacts with the pin 48 through cam member 40 to impart axial movement of the pumping member 38 between a first position (as shown in FIG. 3) adjacent the oil inlet 34 and outlet 36 whereat oil is pumped relative to the rotary and axial movement of the pumping member. When the control member 50 is moved in the opposite direction to a second position (as shown by FIG. 4) whereat the pumping member is removed from the oil inlet and outlet ports 34 and 36 whereby it does not contact them during rotary and axial movement with the result that the pumping and flow of oil is interrupted. In this manner, the control member 50 provides a positive positioning means for the selective regulation of oil flow from maximum flow to interruption of oil flow when it is not needed. Also in accordance with the embodiment shown in FIGS. 2-4, means can be provided for moving and securing the control member at the selected positions. As shown in FIG. 2, the control member can be provided with a spring means 60 such as a helical spring attached to a housing stud 62 urging or biasing the control member into the first position maximum flow (FIG. 3) while still being yieldable to movement of rod member 64 for moving the control member 50 through intermediate positions for reducing the flow to, for example, the second or last position as shown by FIG. 4 at which position there is no flow of oil. The rod member can be releasably secured in the selected positions by placing the notches 66 of rod member 64 in the notch receiver 68 secured to frame 12.

It is to be understood that the control 50 and associated moving and securing means are symbolic and that other positive positioning means remote or adjacent, and manual or automatic, can be employed to move pin member 48 and thereby regulate the quantity of flow of lubricating oil.

Figure 6:
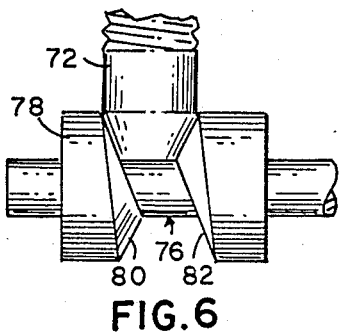
FIGS. 6, 7 and 8 are fragmentary schematic views showing various positions of the device which regulates the flow of lubricating oil in accordance with the invention.
Figures 7, 8:
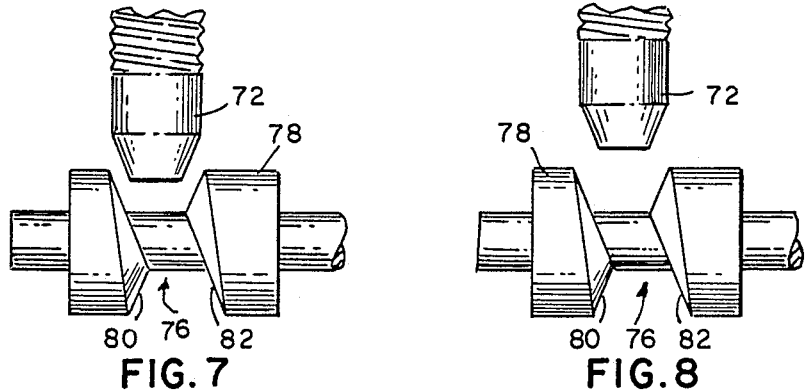

Referring now to FIGS. 5-8, there is shown another embodiment of the invention for regulating the flow of lubricating oil. In this embodiment, the lubricating pump 70 is similar to pump 28 of FIG. 2 except for the means selectively varying the flow of oil. As shown, the oil flow control means comprises a threaded camming pin member 72 which threadedly engages housing frame 12 and has a tapered end portion 74 which is received by the tapered groove 76 of cam 78. Tapered groove 76 is defined by sides 80 and 82 and is inclined or disposed at an angle to a plane perpendicular to the axis of pumping member 38 as discussed above with respect to FIGS. 2-4. As mentioned above, suitable positive positioning means manual or automatic, remote or adjacent, can be employed to rotate camming pin member to various selected positions relative to the cam groove 76. Suitable manual means can, for example, be a torque device such as a ratchet wrench applied to rib elements 84. In operation, the camming pin 72 is raised or lowered to provide various stages of engagement with the cam groove from full engagement to no engagement to thereby vary the stroke distance of the pumping member 38 and the amount of flow of lubricating oil from full maximum flow through to fully off. FIG. 6 illustrates full engagement of the camming pin 72 with the cam groove. In this position the full stroke of the pumping member 38 through a predetermined stroke distance is provided resulting in maximum pumping of oil. As shown in FIG. 7 the camming pin 72 is raised so that only partial contact of the camming pin 72 with the cam groove surfaces is achieved during rotation of the pumping member 38. Positive contact is intermittent because the cam stroke is greater than pin and groove. A partial stroke of pumping member 38 is achieved thereby reducing the stroke distance of the pumping member 38 which results in a reduction in the amount of oil pumped. As shown in FIG. 8, when the camming pin 72 is raised to a position where there is no contact with the cam groove, the axial stroke of pumping member 38 is stopped and the pumping of oil is interrupted to provide a condition of no oil flow.

Figure 9:
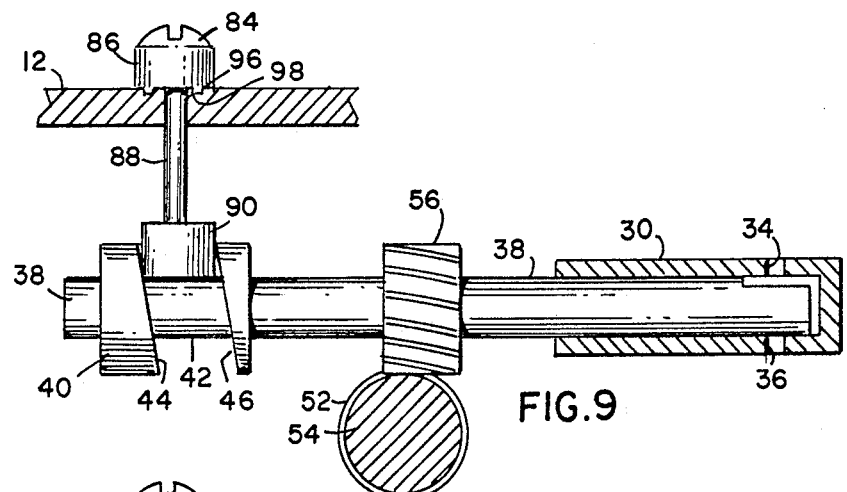
FIG. 9 is a fragmentary side elevation view partly in section of a lubricating pump showing still another embodiment of the present invention in full pumping mode.
Figure 10:
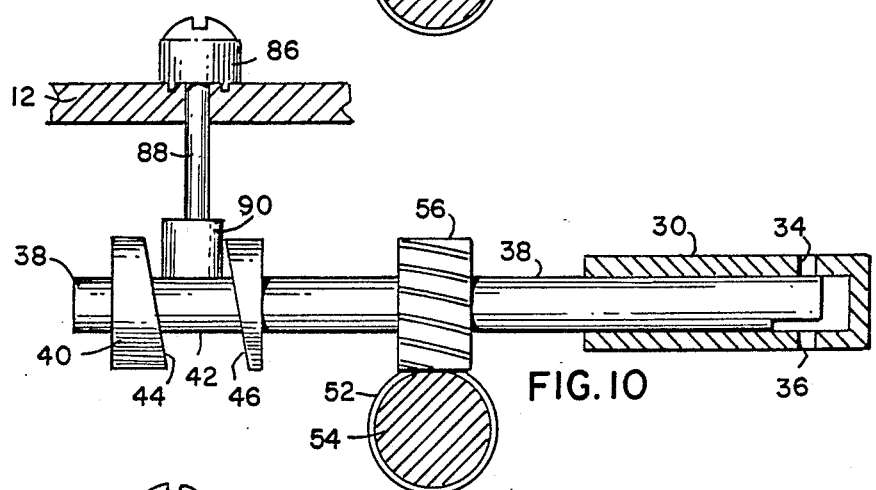
FIG. 10 is a fragmentary side elevation view partly in section of the lubricating pump of FIG. 9 shown in an intermediate reduced pumping mode.
Figure 11:
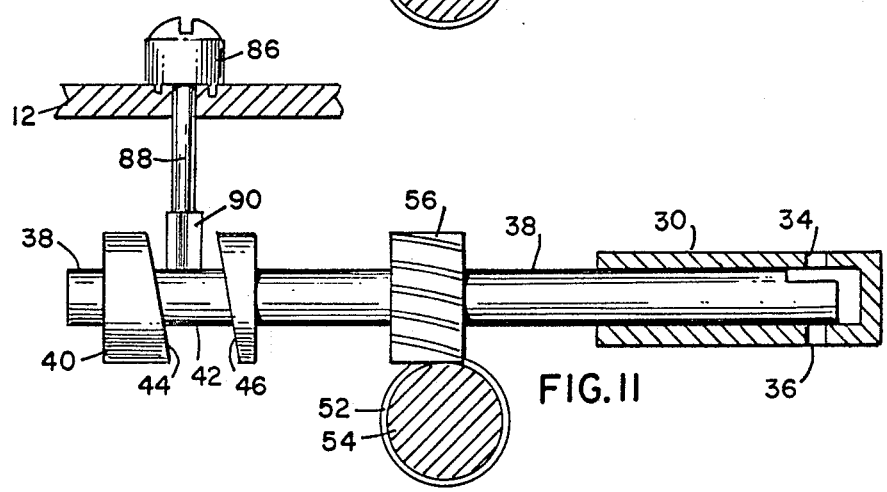
FIG. 11 is a side elevation view of the lubricating pump of FIG. 9 shown in a fully interrupted mode.
Figure 12:
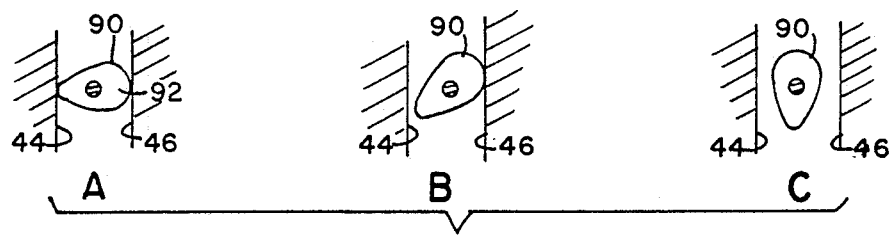
FIG 12 is a top view of a schematic representation showing the operational relationship of the cam and pin members of FIGS. 9, 10 and 11.

Referring now to FIGS. 9-12, there is illustrated still another embodiment of the invention. In this embodiment the lubricating pump 94 is similar to pump 70 except that the means for controlling or regulating the amount of oil pumped by pumping member 38 includes a pin member 86 which is rotatable in the bore 88 of housing 12 and has at least a configured lower end portion 90 which engages the cam groove 42 of cam member 40 to provide reciprocatory movement of the pumping member 38. The lower portion 90 of pin member 86 is configured to have a variable cross-sectional area 92 illustrated as a "tear-drop" like shape, for example, as best seen in FIG. 12. In this embodiment, rotation of pin member 86 about its vertical axis rotates the end portion 90 within the cam groove 42 so that when in the position shown in FIGS. 9 and 12A both surfaces 44 and 46 of cam groove 42 are engaged to provide a full stroke distance of the pumping member 38. Further rotation of pin member 86 to the position shown in FIGS. 10 and 12B, for example, reduces the amount of contact of pin member 86 with the cam groove surfaces during rotation of pumping member 38 thereby resulting in a reduced or partial stroke distance of pumping member 38 and a reduction in the amount of oil being pumped. Further, rotation of pin member 86 to the position shown in FIGS. 11 and 12C where there is no contact by pin member 84 with the surfaces of cam groove 42 results in interruption of the reciprocatory stroke action of pumping member 38 and thereby effects interruption of the pumping of lubricating oil. The lubricating pump 94 of FIGS. 9-11 is similar to the pump 28 of FIG. 2 in all other respects. The pin member 86 can be provided with means for positive positional rotation, such as, for example, ribs 84 and studs 96 and corresponding detents 98 in frame 12 for releasably holding the pin member 86 in a selected rotary position. Again it is to be understood that such positive positioning rotational means is symbolic and that other suitable positive positional means can be employed which can be either manual or automatic.

It is believed evident from the foregoing that the present invention provides an improved lubricating pump control apparatus for regulating the flow of oil to the work tool of a motor driven apparatus from maximum flow to interrupted flow.

There are numerous situations in the operation of a motor-drive: apparatus such as a chain saw where it is desirable to vary the oil delivery to the work tool. For example, when the speed of the motor is reduced to idle speed, when the size of the saw chain is changed to a smaller size, and when the work piece is changed from dry wood to moist wood, reduction in the amount of oil delivery is desirable to accommodate each situation. By the same token when the foregoing situations are reversed an increase in the amount of oil flow is desirable to accommodate the situation.

It can be appreciated that the present invention provides the advantage of variable oil delivery to accommodate the varying requirements of the work tool and work piece.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

I claim:

1. An oil pump for supplying lubricating oil to the work tool of a motor driven apparatus including a frame supporting said work tool, wall means on said frame defining an elongated pumping chamber having a central axis and including an oil inlet port and an oil outlet port, a pumping member configured to rotate about said central axis and to reciprocate through a predetermined stroke distance along the central axis for pumping said oil, and means to effect rotary movement of said pumping member the improvement comprising:

an annular cam groove inclined relative to the axis of rotation to define the predetermined stroke distance;

a pin member coating with the annular cam groove for causing the pumping member to reciprocate through the predetermined stroke distance in response to the rotary motion; and control means for selectively moving the pin parallel to the axis of rotation for moving the pumping member axially for causing the pumping member to move axially relative to the inlet and outlet ports for selectively varying the amount of oil being pumped by said predetermined stroke.

2. A lubricating oil pump control as defined in claim 1 where the means for moving the pin moves the pin parallel to the axis of rotation for moving the pumping member axially between a first position adjacent to the oil inlet and oil outlet ports for pumping a maximum amount of oil due to the rotary and reciprocating movement of the pumping member, a second position removed from the inlet and outlet ports where no oil is pumped away from said inlet and outlet ports, and intermediate positions in between whereby intermediate flow of oil is achieved.

3. An oil pump for supplying lubricating oil to the work tool of a motor driven apparatus comprising:

a frame supporting said work tool;

wall means on said frame defining a pumping chamber including an oil inlet port and an oil outlet port;

a pumping member rotatable in said pumping chamber relative to said inlet and outlet ports so as to effect pumping operation incident to such rotation;

a drive shaft supported by said frame for rotation and having fixed thereon a first gear;

a second gear meshed with said first gear for rotation thereof in response to first gear rotation and carried for rotary and axial movement relative to said pumping member;

a cam member fixed on said pumping member and rotatable therewith; an annular groove formed in said cam member and inclined to a plane perpendicular to the axis of rotation of said pumping member;

a pin member extending from said frame said engaging said annular groove for positively displacing said pumping member in one axial direction and thereafter in the opposite axial direction in response to rotation of said cam member;

control means for selectively varying the flow of oil to said work tool:

said control means including a control member coacting with said pin member for axial movement of said pin and groove for moving said pumping member axially within said pumping chamber between a first position adjacent said oil inlet and outlet ports whereat a maximum supply of oil is pumped relative to the rotary and axial movement of said pumping member and a second position removed from said oil inlet and outlet ports whereat the pumping of oil relative to the rotary and axial movement of said pumping member is interrupted.

* * * * *